(12) United States Patent
Koike et al.

(10) Patent No.: US 10,855,852 B2
(45) Date of Patent: Dec. 1, 2020

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventors: Hiroaki Koike, Kokubunji (JP); Atsushi Ikeda, Toride (JP); Takeshi Kogure, Toride (JP); Naoto Sasagawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/503,782

(22) Filed: Jul. 5, 2019

(65) Prior Publication Data

US 2020/0021692 A1    Jan. 16, 2020

(30) Foreign Application Priority Data

Jul. 10, 2018  (JP) .................................. 2018-130888

(51) Int. Cl.
*H04N 1/00*    (2006.01)

(52) U.S. Cl.
CPC ..... *H04N 1/00013* (2013.01); *H04N 1/00005* (2013.01); *H04N 1/00037* (2013.01); *H04N 1/00801* (2013.01)

(58) Field of Classification Search
CPC .............. G06F 11/2069; G06F 11/324; G06F 11/3684; G06F 11/3664; G06F 3/1204; G06F 3/1205; G06F 3/1212; G06F 3/1236; G06F 3/1257; G06F 3/1292; G06F 9/451; G06F 11/0757; G06F 11/0796;

(Continued)

(56) References Cited

U.S. PATENT DOCUMENTS

| 5,805,298 A  * | 9/1998 | Ho ..................... H04L 12/5692 358/402 |
| 7,570,396 B2 * | 8/2009 | Murakami ......... H04N 1/00214 358/402 |

(Continued)

FOREIGN PATENT DOCUMENTS

| JP | 2001-209527 A | 8/2001 |
| JP | 2007-272763 A | 10/2007 |

(Continued)

OTHER PUBLICATIONS

Copending, unpublished U.S. Appl. No. 16/458,868, to Atsushi Ikeda, et al., filed Jul. 1, 2019.

(Continued)

*Primary Examiner* — Negussie Worku

(74) *Attorney, Agent, or Firm* — Venable LLP

(57) ABSTRACT

The present invention provides an image processing apparatus comprising: a memory device that stores a set of instructions; and at least one processor that executes the set of instructions to: detect alteration of an application held in the image processing apparatus; determine, upon detecting alteration, whether or not an application in which alteration has been detected is a pre-installed application; and enabling, as a result of the determination, in a case where the application in which alteration has been detected is a pre-installed application, the use of the application by installing the application using pre-held information.

12 Claims, 7 Drawing Sheets

(58) Field of Classification Search
CPC ............ G06F 11/1451; G06F 11/1464; G06F 11/1469; G06F 21/57; G06F 11/1633; G06F 11/1675; G06F 11/3688; G06F 3/1207; G06F 3/121; G06F 3/1255; G06F 3/1259; A01K 2217/05; A01K 2217/075; A61K 38/00; C07K 14/705; C12Q 1/6883; H04H 60/31; H04H 60/66; G06Q 20/3674
USPC .......................................................... 358/471
See application file for complete search history.

(56) References Cited

U.S. PATENT DOCUMENTS

| | | | | |
|---|---|---|---|---|
| 8,219,496 | B2* | 7/2012 | Pearson | G06Q 20/3674 705/67 |
| 8,854,659 | B2 | 10/2014 | Koike | |
| 9,029,791 | B1* | 5/2015 | Kovalski | A61B 6/4258 250/369 |
| 9,032,481 | B2 | 5/2015 | Ikeda | |
| 9,915,737 | B2* | 3/2018 | Grobshtein | A61B 6/467 |
| 2004/0258276 | A1* | 12/2004 | Ishii | G06F 21/608 382/100 |
| 2005/0152006 | A1* | 7/2005 | Abe | G06F 21/64 358/3.28 |
| 2005/0219604 | A1* | 10/2005 | Murakata | H04N 1/0084 358/1.14 |
| 2006/0021028 | A1* | 1/2006 | Brunette | G06F 21/57 726/22 |
| 2007/0118499 | A1* | 5/2007 | Hwang | G06F 9/44521 |
| 2011/0242587 | A1* | 10/2011 | Fukaya | G06F 3/1204 358/1.15 |
| 2012/0303583 | A1* | 11/2012 | Chowdhry | G06F 11/1451 707/640 |
| 2015/0327831 | A1* | 11/2015 | Levin | A61B 6/0407 600/427 |
| 2016/0022228 | A1* | 1/2016 | Khen | G06T 11/005 250/363.05 |
| 2016/0270744 | A1* | 9/2016 | Sachs | A61B 6/037 |
| 2018/0048776 | A1 | 2/2018 | Kogure | |
| 2018/0241913 | A1* | 8/2018 | Ho | H04N 1/32 |
| 2019/0320075 | A1* | 10/2019 | Ho | G06F 21/602 |
| 2020/0026554 | A1* | 1/2020 | Kogure | G06F 8/61 |

FOREIGN PATENT DOCUMENTS

| | | |
|---|---|---|
| JP | 2009-294859 A | 12/2009 |
| JP | 2015069403 A | 4/2015 |

OTHER PUBLICATIONS

"Don't forget! Windows Server 2008/R2 EOS," PC—Webzine vol. 316, Japan, PC—Webzine Editorial Office, May 25, 2018, vol. 316, pp. 14-20.

Japanese Office Action dated Jun. 22, 2020 in counterpart Japanese Patent Appln. No. 2018130888.

* cited by examiner

IMAGE PROCESSING APPARATUS, CONTROL METHOD THEREOF, AND STORAGE MEDIUM

BACKGROUND OF THE INVENTION

Field of the Invention

The present invention relates to an image processing apparatus, a control method thereof, and a storage medium.

Description of the Related Art

When a program of an apparatus has been altered, for example, when a program of a login application has been altered, if the login program is stopped, the apparatus can be freely used because restriction by authentication is no longer performed. In such a case, when alteration of a program is detected, the program needs to be re-installed or another program needs to be used in order to use the apparatus. Japanese Patent Laid-Open No. 2015-69403 discloses a technology in which, in an information processing apparatus, when alteration of program information held in a second storage region is detected, a program is restarted based on program information held in a first storage region. With this, even if program information has been altered, a predetermined program stored in another storage region can be used, and the user-friendliness can be ensured.

However, the above-mentioned known technology has the following problems. For example, in order to start a program in another storage region when program information is altered, the program and the program information need to be held in each of the first storage region and the second storage region that are provided in the apparatus. However, in a low-cost image processing apparatus having a storage region of a limited capacity or the like, it is difficult to hold each program and each program information in another storage region in advance in order to deal with alteration of the program information from a viewpoint of a memory resource. On the other hand, if the program is re-installed when alteration of a program has been detected, the user needs to perform a cumbersome task, which requires time and effort.

SUMMARY OF THE INVENTION

The present invention enables realization of a mechanism for making it possible, when alteration of a pre-installed application has been detected, to use the application by favorably overwrite-installing the application using information in an apparatus.

One aspect of the present invention provides an image processing apparatus comprising: a memory device that stores a set of instructions; and at least one processor that executes the set of instructions to: detect alteration of an application held in the image processing apparatus; determine, upon detecting alteration, whether or not an application in which alteration has been detected is a pre-installed application; and enabling, as a result of the determination, in a case where the application in which alteration has been detected is a pre-installed application, the use of the application by installing the application using pre-held information.

Another aspect of the present invention provides a control method of an image processing apparatus comprising: detecting alteration of an application held in the image processing apparatus; determining, upon detecting alteration in the detecting, whether or not an application in which alteration has been detected is a pre-installed application; and enabling, as a result of the determination in the determining, in a case where the application in which alteration has been detected is a pre-installed application, the use of the application by installing the application using pre-held information.

Still another aspect of the present invention provides a non-transitory computer-readable storage medium storing a computer program for causing a computer to execute steps of a control method of an image processing apparatus, the control method comprising: detecting alteration of an application held in the image processing apparatus; determining, upon detecting alteration in the detecting, whether or not an application in which alteration has been detected is a pre-installed application; and enabling, as a result of the determination in the determining, in a case where the application in which alteration has been detected is a pre-installed application, the use of the application by installing the application using pre-held information.

Yet still another aspect of the present invention provides an image processing apparatus comprising: an operation unit; a storage unit; a verification unit that verifies an application held in the image processing apparatus; and a control unit that, in a case where alteration of the application has been detected by the verification unit, and data for installing the application is held in the storage unit, installs the application using the data for installation held in the storage unit, without accepting a user instruction given through the operation unit.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that a multi-function peripheral (digital MFP/MFP) will be described as an example of the image processing apparatus according to the embodiments. However, the application range is not limited to the MFP, and the apparatus to which the present invention can be applied need only include an image processing function.

First Embodiment

Configuration of an Image Reading Apparatus

Hereinafter, a first embodiment of the present invention will be described with reference to the attached drawings. First, the hardware configuration of an MFP in the present embodiment will be described with reference to FIG. 1.

Figure 1:
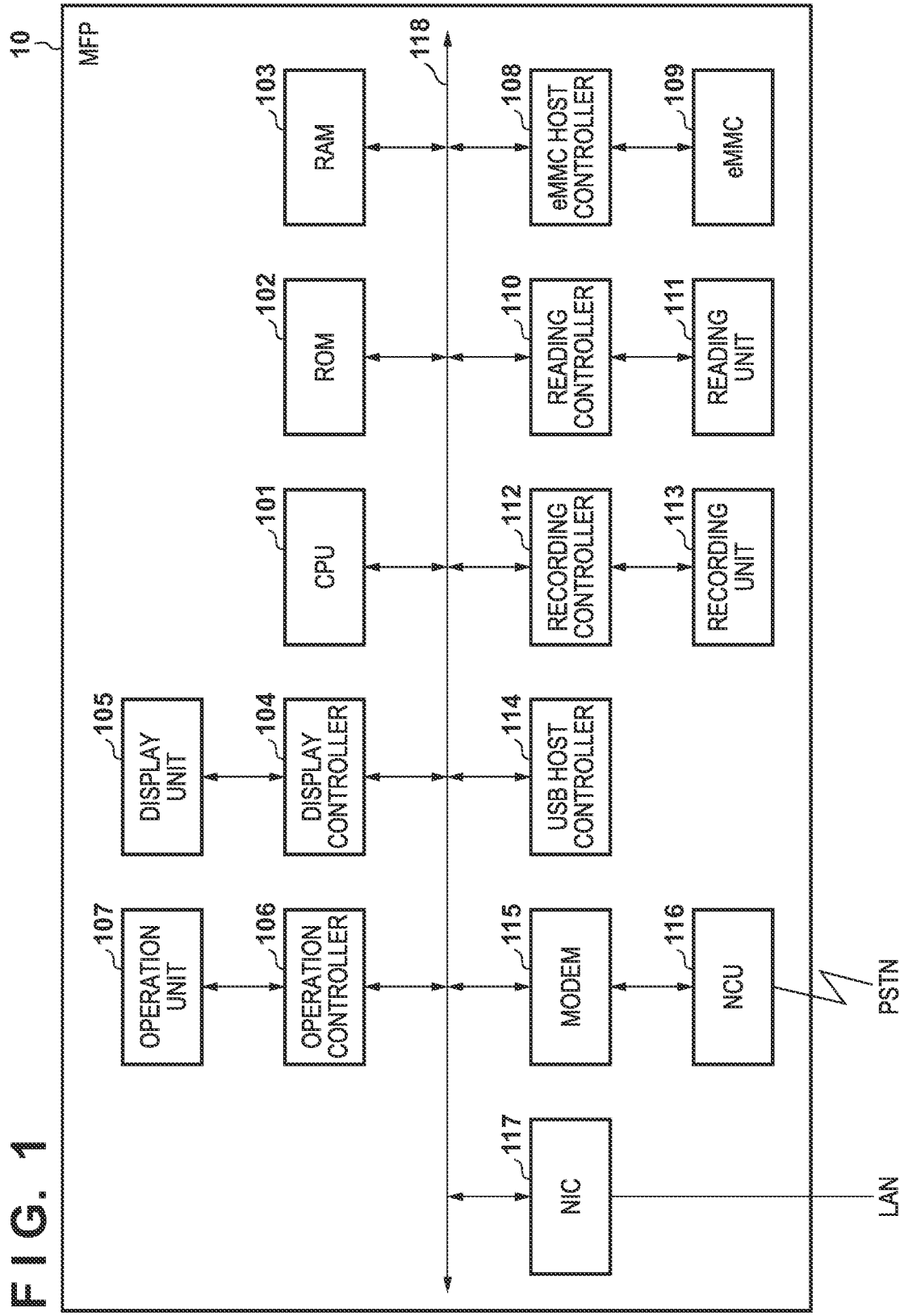
FIG. 1 is a block diagram illustrating a hardware configuration of an MFP according to one embodiment.

As shown in FIG. 1, an MFP 10 includes a CPU 101, a ROM 102, a RAM 103, a display controller 104, a display unit 105, an operation controller 106, and an operation unit 107. Also, the MFP 10 includes an eMMC host controller 108, an eMMC 109, a reading controller 110, a reading unit 111, a recording controller 112, and a recording unit 113. Moreover, the MFP 10 includes a USB host controller 114, a modem 115, a network control unit (NCU) 116, and a network interface card (NIC) 117.

The CPU 101 performs overall control on the devices that are connected to the system bus 118. The CPU 101, upon being supplied with power, executes a boot program stored in the ROM 102. Usually, the boot program loads a main program saved in a specific region of the eMMC 109 to the RAM 103, and sets the pointer at the head of the loaded main program. The RAM 103 functions not only as a location to which the main program is loaded, but also as a work area of the main program and the like. The CPU 101 controls switching between screen displays shown in FIGS. 4 and 5, by executing control programs described in later-described FIGS. 6 to 8.

The display controller 104 controls rendering with respect to the display unit 105. The display unit 105 is a full bit map LCD of a WVGA size. On the other hand, the operation controller 106 controls inputs from the operation unit 107 provided in the MFP 10. The operation unit 107 is constituted by a touch panel that is overlaid on the display unit 105.

The reading unit 111 performs reading of a document. The reading unit 111 is provided with an automatic document feeder (illustration omitted) as an option, and can automatically read a plurality of sheets of a document while conveying the sheets one by one. The reading unit 111 is connected to the reading controller 110, and the CPU 101 can exchange information with the reading unit 111 via the reading controller 110.

Also, the recording unit 113 forms an image on a recording sheet using an electrographic method. The recording sheets in the present embodiment include sheets on check grammar surfaces images are to be formed. The recording unit 113 is connected to the recording controller 112, and the CPU 101 exchanges information with the recording unit 113 via the recording controller 112.

The USB host controller 114 performs USB protocol control, and mediates access to a USB device such as a USB memory (illustration omitted). The modem 115 performs modulation/demodulation of signals necessary for facsimile communication. Also, the modem 115 is connected to the NCU (network control unit) 116. The signals modulated by the modem 115 are transmitted to a public network (PSTN) via the NCU 116.

The NIC (Network Interface Card) 117 bidirectionally transmits and receives data to and from mail and file servers and the like via a LAN. Also, the NIC 117 bidirectionally transmits and receives data to and from a Web server and the like. The MFP 10 of the present embodiment includes the eMMC 109 as storage. The CPU 101 accesses the eMMC 109 via the eMMC host controller 108.

Software Configuration

Figure 2:
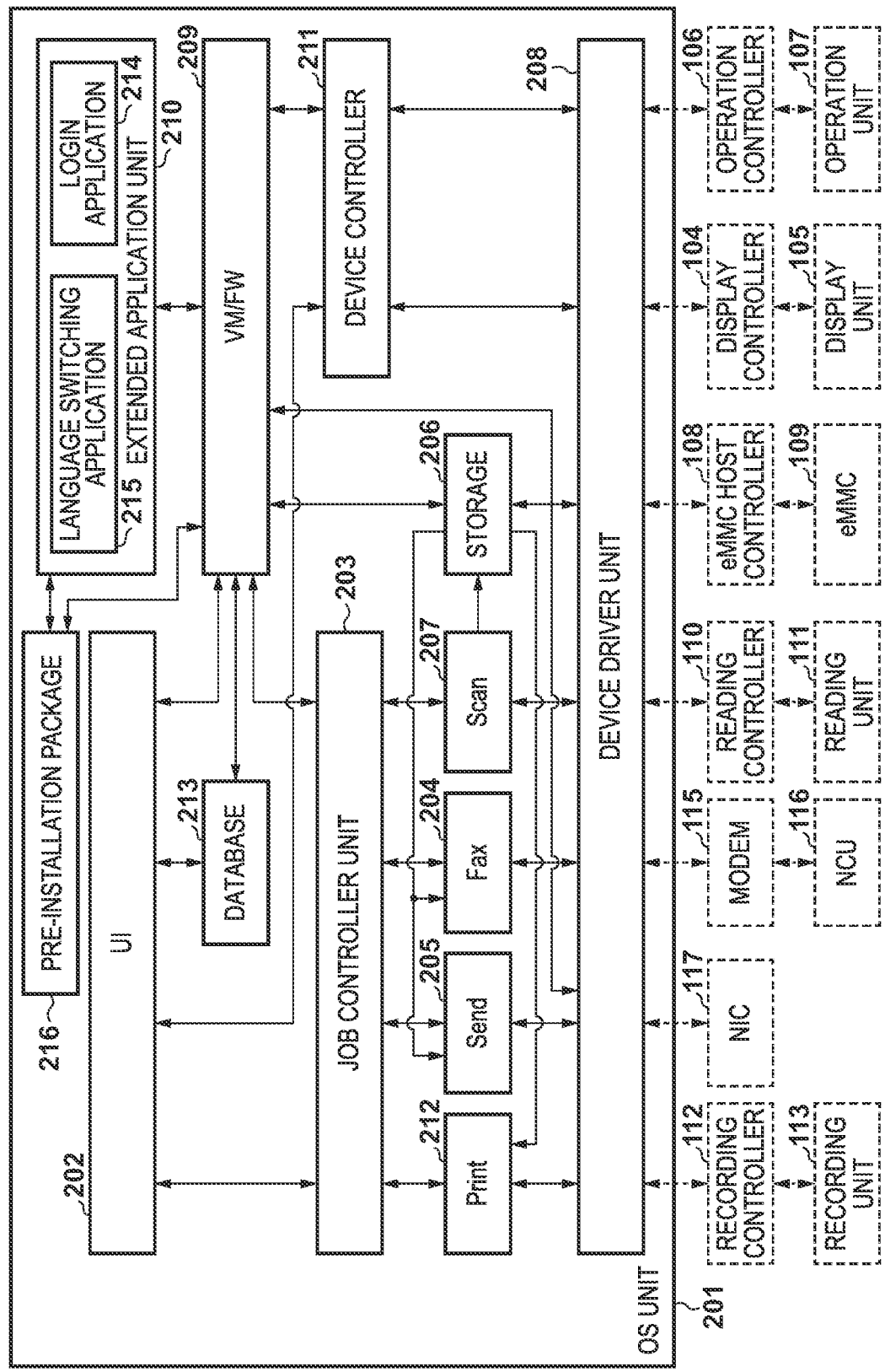
FIG. 2 is a block diagram illustrating a software configuration of an MFP according to one embodiment.

Next, the software configuration of the MFP 10 according to the present embodiment will be described with reference to FIG. 2. The units indicated by the solid lines in FIG. 2 are software modules that can be realized by the CPU 101 executing the main program loaded to the RAM 103 using the aforementioned boot program.

The main program manages/controls execution of later-descried modules with an OS (Operating System) unit 201. A device driver unit 208 is included in the OS unit 201. The device driver unit 208 mediates exchange of information with hardware devices such as the display controller 104, the operation unit controller 106, and the reading controller 110.

A UI (User Interface) unit 202 provides various types of information to a user via the display unit 105 and accepts various types of instructions made on the operation unit 107 by the user. Various settings for switching the behavior of the MFP 10 can be changed through the UI unit 202. The various settings changed through the UI unit 202 are physically stored in the eMMC 109 via a data base unit 213. The setting of a display language that can be changed through the UI unit 202 is one of the various settings.

A job controller unit 203 accepts jobs such as copy, print, FAX, and transmission, and controls execution of the accepted job via the functional units such as a printer unit 212, a sender unit 205, a FAX unit 204, and a scanner unit 207. The storage unit 206 is a software module for physically storing an image that is transmitted or received by facsimile and data such as application settings requested by an extended application unit 210 to the eMMC 109 and managing these pieces of data.

For example, in the MFP 10 of the present embodiment, when the job controller unit 203 has accepted a facsimile transmission job, the scanner unit 207, in response to the job request, scans a document by controlling the reading unit 111. Then, the scanner unit 207 stores the facsimile image data obtained by scanning to the storage unit 206. The facsimile image data stored in the storage unit 206 is read out by the FAX unit 204, and is transmitted through facsimile to the other party via the modem 115 and the NCU 116. Alternatively, the image data received from the other party through facsimile via the modem 115 and the NCU 116 is taken in by the FAX unit 204, and is stored in the storage unit 206.

The MFP 10 of the present embodiment includes a VM (Virtual Machine)/FW (Framework) unit 209. The extended application unit 210 is physically arranged in the eMMC 109, and stores a plurality of applications from any program that is described using a scripting language, and the like. For example, program languages such as Java (registered trademark) and Lua, which are interpreters that interpret and execute bytecodes, may be used.

A VM/FW unit 209 installs any program described using a scripting language or a predetermined high-level language in the extended application unit 210. Alternatively, the VM/FW unit 209 has a function of uninstalling a program from the extended application unit 210. At the same time, the VM/FW unit 209 holds status information of an installed application including information regarding whether or not the application is active in the storage unit 206. Also, the VM/FW unit 209 has an ability to, if a pre-installation package 216 in which a plurality of pre-installed applications are compressed is present in the ROM 102, extracts and installs a preinstalled application in the extended application unit 210, as necessary. The detailed description thereof is omitted. It is desirable that the pre-installation package 216 is already stored at a time when the apparatus is shipped from a factory. That is, according to the present embodiment, with respect to an application pre-installed in the apparatus, the MFP 10 holds an installation package of the application in order to verify the application and re-install the application when alteration of the application is detected. With this, when alteration of the application has been detected, the application can be automatically re-installed, and the user-friendliness can be improved. Furthermore, the memory resource can be effectively used, compared with a method in which a program is stored in another storage region with respect to each application.

Furthermore, the VM/FW unit 209 has a function of arbitrating between a function realized by any program installed in the extended application unit 210 and an existing function, and the like. Also, the VM/FW unit 209, upon a button displayed in the display unit 105 being selected, loads a scripting language of a corresponding application to the RAM 103, and interprets and executes the content thereof. With this, the MFP 10 of the present embodiment can easily realize any function such as a login application 214 or a language switching application 215 while keeping the detachability to functions. Furthermore, the VM/FW unit 209, upon receiving a request from any program installed in the extended application unit 210, refers to and changes the various setting values of the data base unit 213.

A UI device controller 211 mediates the output of various types of information to the display unit 105 from the UI unit 202 and the extended application unit 210, and transmitting a user operation to the UI unit 202 and the extended application unit 210 from the operation unit 107.

Data Structure

Figure 3:
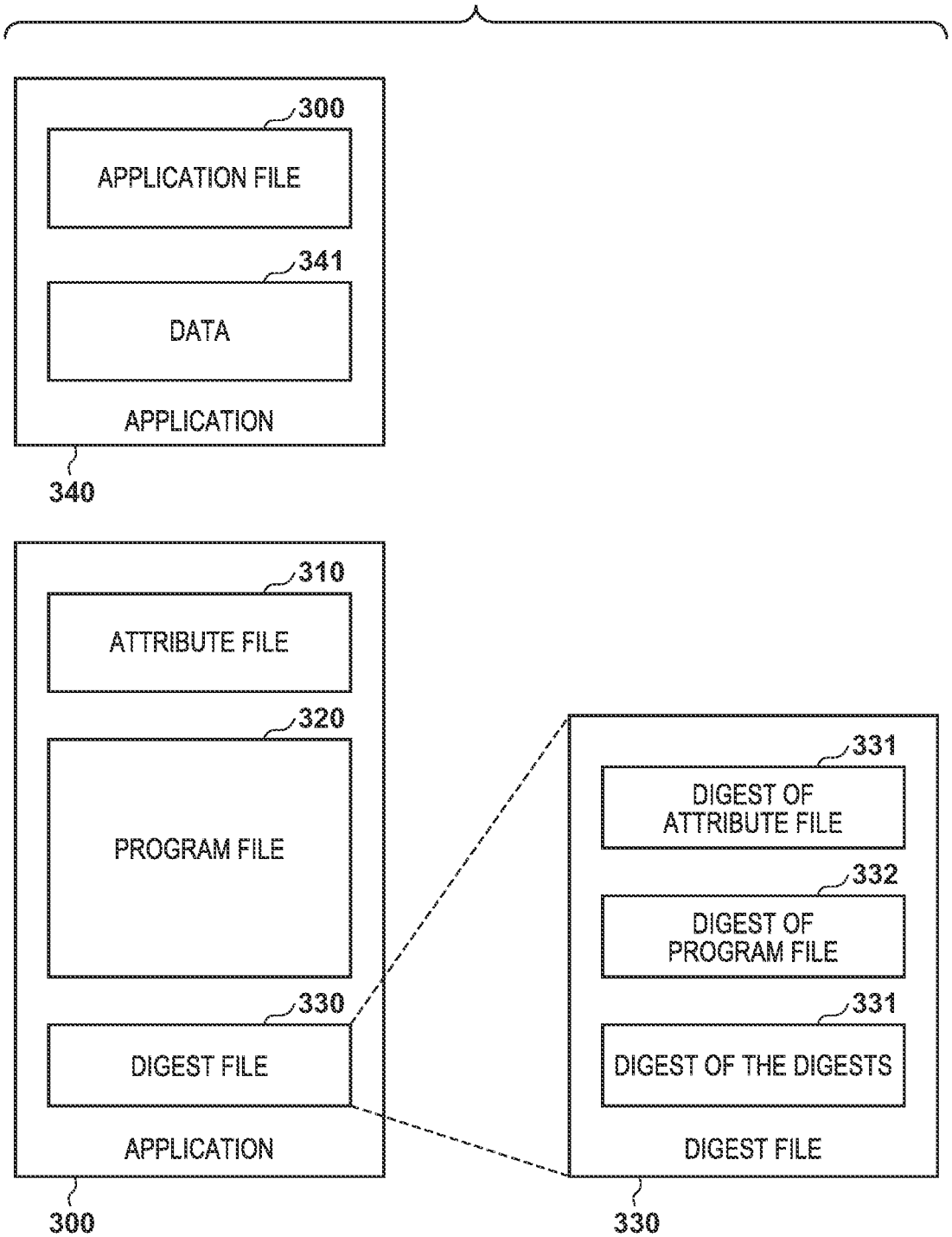
FIG. 3 is a diagram illustrating a data structures of each application of an extended application unit 210 and the data structure of a digest file according to one embodiment.

Next, the configuration of each application saved in the extended application unit 210 according to the present embodiment, the file configuration of each application, and the data structure of a digest file will be described with reference to FIG. 3.

An application 340 is constituted by an application file 300 and data 341. Information such as setting values used in the application is recorded in the data 341. The application file 300 includes an attribute file 310, a program file 320, and a digest file 330. Information (type information) indicating the type of a program included in the application is recorded in the attribute file 310 in addition to the name and version information of the application 340. Specifically, information (pre-installation attribute) with which whether or not the program is a program pre-installed in the apparatus can be determined is recorded in the attribute file 310. The program file 320 stores a program described in an aforementioned scripting language.

The digest file 330 is a file for holding a digest value (hereinafter, also referred to as a hash value) in which alteration is to be detected. The digest file 330 includes a digest of an attribute file (first digest) 331, a digest of a program file (second digest) 332, and a digest of the digests 331 and 332 (third digest) 333. A digest value that is expected to be obtained by a hash calculation on the attribute file 310 is recorded in the digest 331 of the attribute file. Similarly, a digest value that is expected to be obtained by a hash calculation on the program file 320 is recorded in the digest 332 of the program file. Moreover, a digest value that is expected to be obtained by a hash calculation on the digest 331 of the attribute file and the digest 332 of the program file is recorded in the digest 333 of the digest.

Alteration Detection

Next, the procedure of subroutine processing for detecting (verifying) alteration of an application according to the present embodiment will be described with reference to FIG. 6. The detection processing described in the following is the processing constituting the VM/FW unit 209, and is executed by the CPU 101. Hereinafter, all processing that will be described later will be executed by the CPU 101. The CPU 101 realizes the following processing by reading out a control program stored in a memory such as the ROM 102 to the RAM 103 and executing the control program, for example.

First, in step S601, the VM/FW unit 209 acquires the hash value of the digest 331 of the attribute file and the digest 332 of the program file of the digest file 330 by calculation. Next, in step S602, the VM/FW unit 209 determines whether or not the acquired hash value matches the recorded digest value by comparing the hash value acquired in step S601 and the digest 333 of the digest. If these values match, the VM/FW unit 209 determines that no anomaly is present, and advances the processing to step S603, and if not, the VM/FW unit 209 advances the processing to step S610.

In step S603, the VM/FW unit 209 acquires the hash value of the attribute file 310 by calculation. Next, in step S604, the VM/FW unit 209 determines whether or not the acquired hash value matches the recorded digest value by comparing the hash value acquired in step S603 and the digest 331 of the attribute file. If these values match, the VM/FW unit 209 determines that no anomaly is present, and advances the processing to step S605, and if not, the VM/FW unit 209 advances the processing to step S609.

In step S605, the VM/FW unit 209 acquires the hash value of the program file 320 by calculation. Next, in step S606, the VM/FW unit 209 determines whether or not the acquired hash value matches the recorded digest value by comparing the hash value acquired in step S605 and the digest 332 of the program file. If these values match, the VM/FW unit 209 determines that no anomaly is present, and advances the processing to step S607, and if not, the VM/FW unit 209 advances the processing to step S608.

In step S607, the VM/FW unit 209 returns a result indicating that alteration of the application is not detected, and the application is in a normal state to the caller of the subroutine, and ends the alteration detection processing. On the other hand, if an anomaly is detected in step S606, in step S608, the VM/FW unit 209 returns a result indicating that alteration of the program file is detected to the caller of the subroutine, and ends the alteration detection processing. Also, if an anomaly is detected in step S604, in step S609, the VM/FW unit 209 returns a result indicating that alteration of the attribute file is detected to the caller of the subroutine, and ends the alteration detection processing. Also, if an anomaly is detected in step S602, in step S610, the VM/FW unit 209 returns a result indicating that alteration of the digest file is detected to the caller of the subroutine, and ends the alteration detection processing.

Processing when Apparatus is Started

Figure 7:
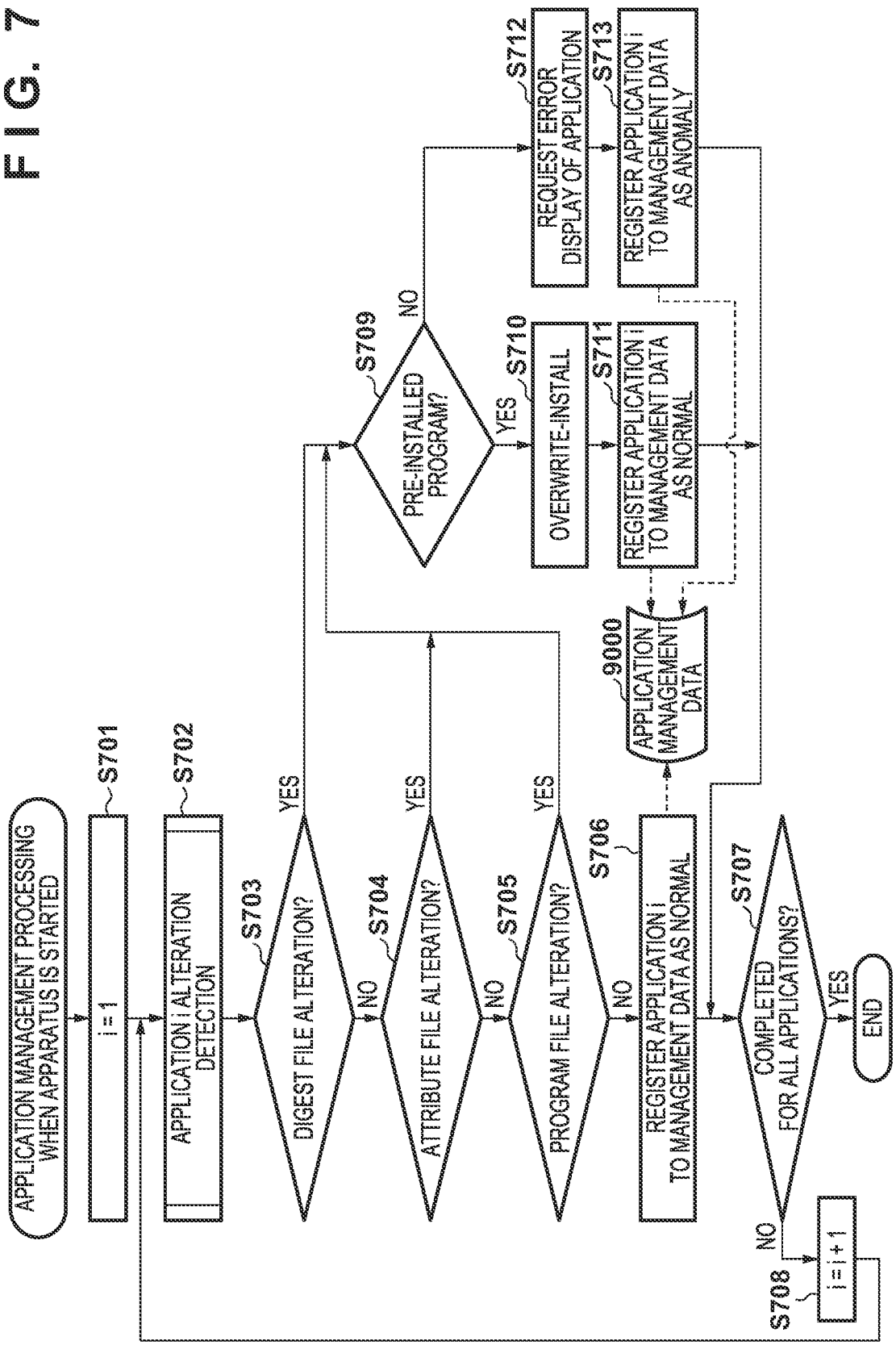
FIG. 7 is a flowchart illustrating a flow of an application management processing when the apparatus is started according to one embodiment.

Next, the flow of processing for application management when the apparatus is started according to the present embodiment will be described with reference to FIG. 7. The processing for application management here is the processing performed in the VM/FW unit 209, and is executed by the CPU 101. Hereinafter, all processing that will be described later will be executed by the CPU 101. The CPU

101 realizes the following processing by reading out a control program stored in a memory such as the ROM 102 to the RAM 103 and executing the control program, for example.

First, in step S701, the VM/FW unit 209 sets one to a variable i, and performs control such that the subsequent processing is to be executed from a first application installed in the extended application unit 210. Next, in step S702, the VM/FW unit 209 calls the subroutine processing for detecting alteration of an application that has been described using FIG. 8, and executes the subroutine in order to confirm whether or not an $i^{th}$ application installed in the extended application unit 210 is altered.

Then, in step S703, the VM/FW unit 209 determines whether or not the returned value of the alteration detection processing indicates that the digest file is altered. If alteration of the digest file is not detected, the VM/FW unit 209 advances the processing to step S704. On the other hand, if alteration of the digest file is detected, the VM/FW unit 209 advances the processing to step S709.

In step S704, the VM/FW unit 209 determines whether or not the returned value from the alteration detection processing indicates alteration of the attribute file. If alteration of the attribute file is not detected, the VM/FW unit 209 advances the processing to step S705. On the other hand, if alteration of the attribute file is detected, the VM/FW unit 209 advances the processing to step S709.

In step S705, the VM/FW unit 209 determines whether or not the returned value from the alteration detection processing indicates alteration of the program file. If alteration of the program file is not detected, the VM/FW unit 209 advances the processing to step S706, and if not, the VM/FW unit 209 advances the processing to step S709. In step S706, the VM/FW unit 209 registers a fact that the $i^{th}$ application is in a normal state in application management data 9000 prepared in the RAM 103, and advances the processing to step S707. Also, the VM/FW unit 209 also registers attribute information of a program included in the $i^{th}$ application in the application management data 9000 at the same time.

Next, in step S707, the VM/FW unit 209 determines whether or not registration of all of the applications installed in the extended application unit 210 has been completed. If the registration has been completed, the VM/FW unit 209 ends the processing of the application registration. On the other hand, if an application that has not been registered yet is present, the VM/FW unit 209 advances the processing to step S708, adds 1 to the variable i, and returns the processing to step S702.

If alteration of the program file is detected in step S703, S704, or S705, in step S709, the VM/FW unit 209 confirms the attribute file 310 of the application, and determines whether or not the program has a pre-installation attribute. If the program has a pre-installation attribute, the VM/FW unit 209 advances the processing to step S710, and if not, the VM/FW unit 209 advances the processing to step S712.

In step S710, the VM/FW unit 209 expands the compressed pre-installation package 216, and overwrite-installs the extracted application to the extended application unit 210. Here, the overwrite-installing means that the application 340 is re-installed in a state of holding the data 341. In step S711, the VM/FW unit 209 registers that the $i^{th}$ application is in a normal state in the application management data 9000 prepared in the RAM 103, and advances the processing to step S707. That is, when a pre-installed application is overwrite-installed, the VM/FW unit 209 performs control such that the application can be started.

Figure 4:
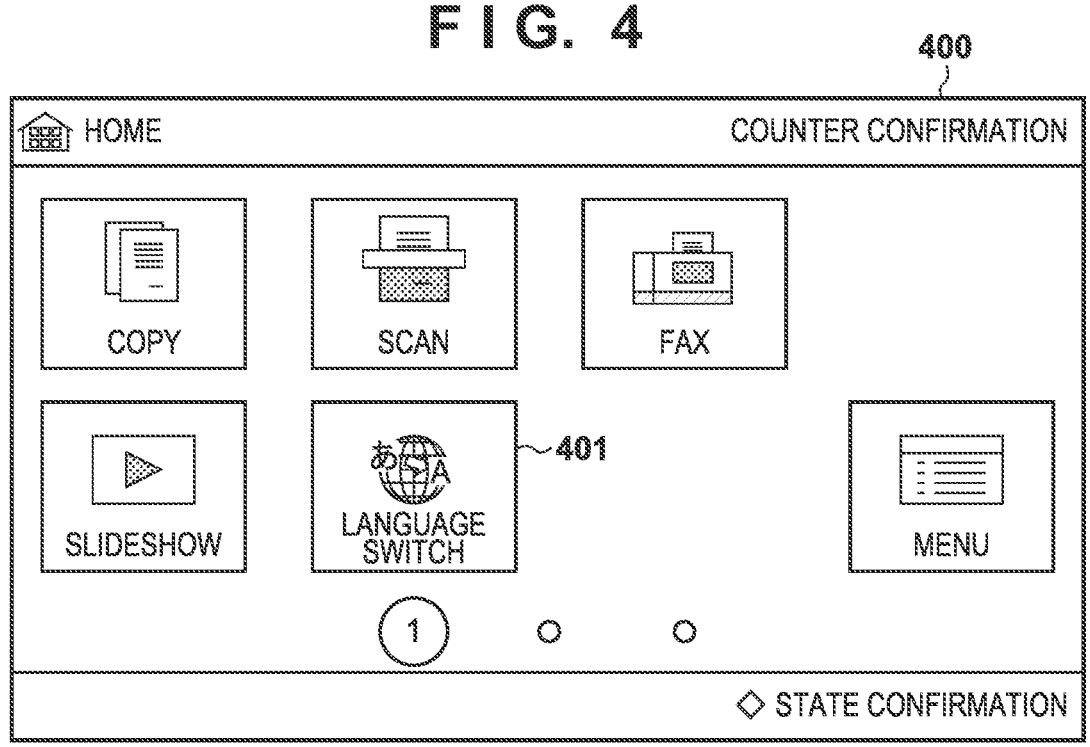
FIG. 4 is a diagram illustrating an example of a home screen that is displayed when an apparatus is started according to one embodiment.

Here, a later-described home screen in FIG. 4 is displayed in the UI unit 202, and each application (function) can be used as usual. Note that, when the re-installation is complete, the VM/FW unit 209 may request the UI unit 202 to display a message indicating that a given application is altered, and the given application is re-installed using the pre-installation package 216.

Figure 5:
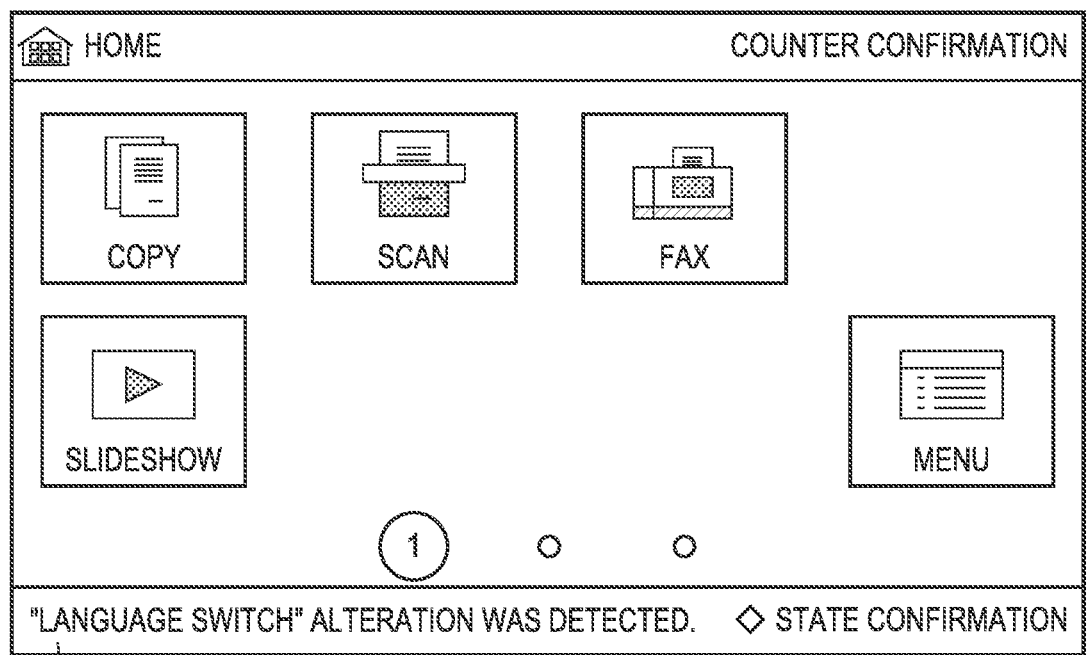
FIG. 5 is a diagram illustrating an example of a screen for displaying a message indicating that alteration of a general-purpose application has been detected according to one embodiment.

On the other hand, in step S712, the VM/FW unit 209 requests the UI unit 202 to perform an error display indicating that an application has been altered. An example of the operation screen displayed by the UI unit 202 that has received the request is shown in FIG. 5. The MFP 10 in the present embodiment displays a message indicating that alteration of an application has been detected in a status region 501 allocated at a lower portion of the screen. FIG. 5 shows an example in which such a message is displayed in the status region 501 when alteration of a language switching application 215 has been detected. Here, a button 401 in later-described FIG. 4, that is, the button for starting the application, is not displayed in the home screen. On the other hand, various buttons are displayed for enabling acceptance of operations to use the other functions of the MFP 10.

In step S712, the VM/FW unit 209, after requesting the UI unit 202 to perform error display, advances the processing to step S713. In step S713, the VM/FW unit 209 registers, with respect to the $i^{th}$ application, a fact that the application is in an anomalous state, in addition to the attribute of the program, to the application management data 9000 prepared in the RAM 103, and advances the processing to step S707. The processing in step S707 has already been described and will be omitted.

Execution of Extended Application

Figure 8:
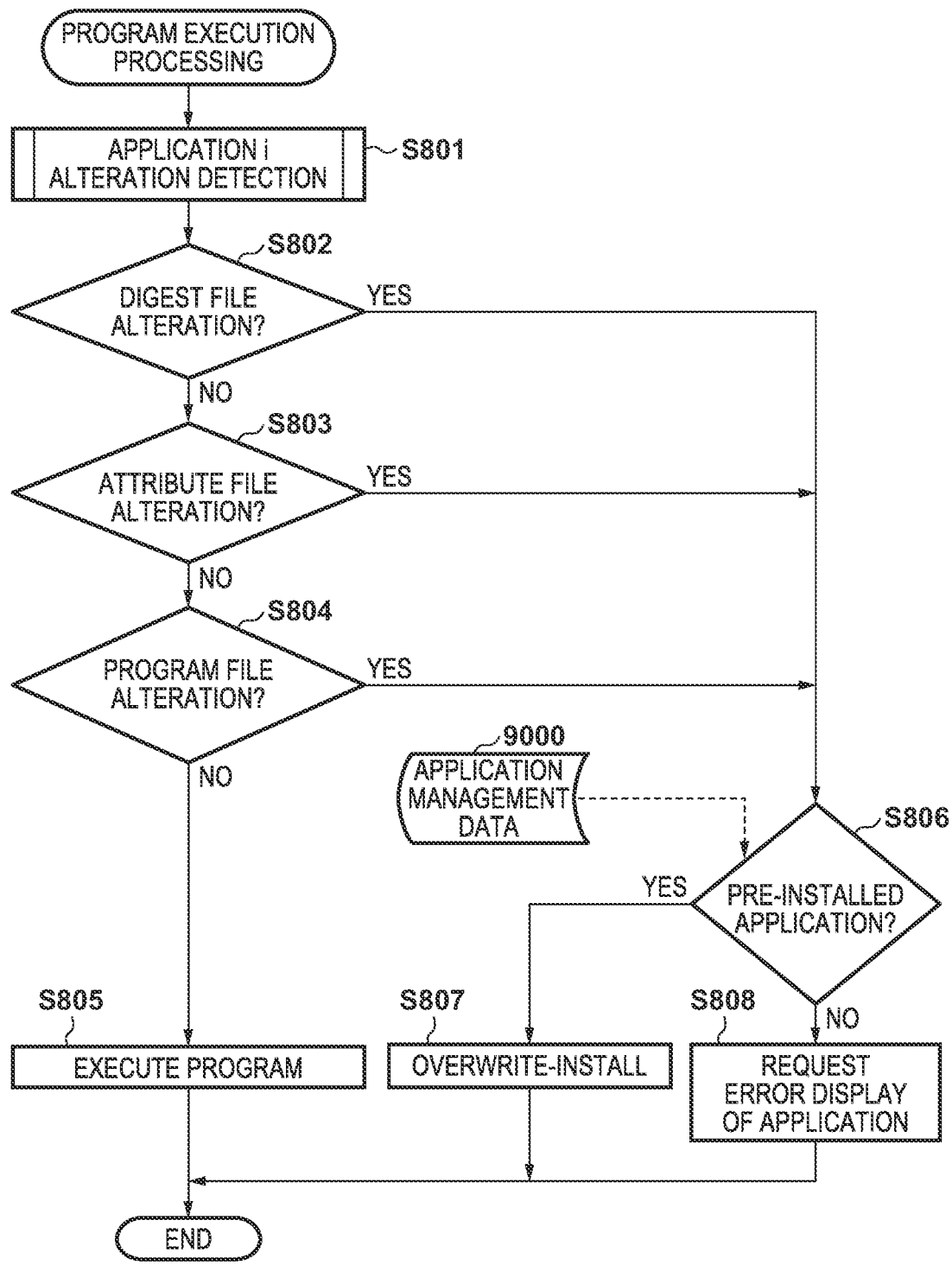
FIG. 8 is a flowchart illustrating a flow of an execution processing of a program of the extended application unit 210 according to one embodiment.

Next, the flow of execution processing of a program of an application installed in the extended application unit 210 will be described with reference to FIG. 8. The execution processing of a program is executed at a timing at which a button, such as the button 401, of any application displayed in the home screen 400 is pressed. The detection processing described in the following is the processing constituting the VM/FW unit 209, and is executed by the CPU 101. Hereinafter, all processing that will be described later will be executed by the CPU 101. The CPU 101 realizes the following processing by reading out a control program stored in a memory such as the ROM 102 to the RAM 103 and executing the control program, for example.

Figure 6:
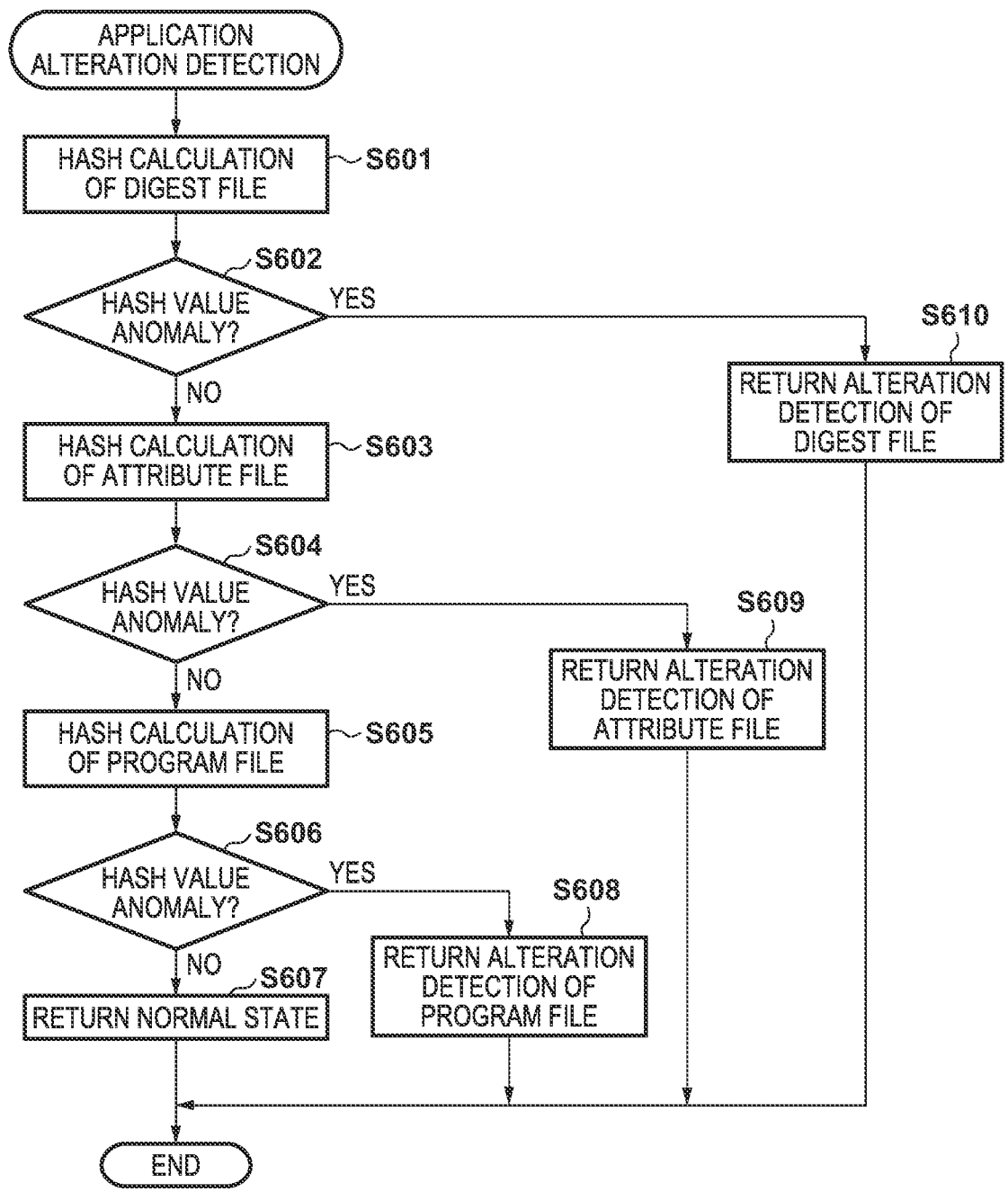
FIG. 6 is a flowchart illustrating a flow of a subroutine processing for detecting alteration of an application according to one embodiment.

First, in step S801, the VM/FW unit 209 calls subroutine processing for detecting alteration of an application described using FIG. 6, and detects alteration of a program of which execution has been requested. Next, in step S802, the VM/FW unit 209 determines whether or not the returned value from the alteration detection processing indicates alteration of the digest file. If alteration of the digest file is not detected, the VM/FW unit 209 advances the processing to step S803. On the other hand, if alteration of the digest file is detected, the VM/FW unit 209 advances the processing to step S806.

In step S803, the VM/FW unit 209 determines whether or not the returned value from the alteration detection processing indicates alteration of the attribute file. If alteration of the attribute file is not detected, the VM/FW unit 209 advances the processing to step S804. On the other hand, if alteration of the attribute file is detected, the VM/FW unit 209 advances the processing to step S806. In step S804, the VM/FW unit 209 determines whether or not the returned value from the alteration detection processing indicates alteration of the program file. If alteration of the program file is not detected, the VM/FW unit 209 advances the processing to step S805, and if not, the VM/FW unit 209 advances the processing to step S806.

In step S805, the VM/FW unit 209 executes the requested program, and ends the program execution processing. On the other hand, if alteration of the file has been detected in step S802, S803, or S804, the VM/FW unit 209 advances the processing to step S806, and determines the attribute of the requested program. Here, the attribute of the program has been registered in the application management data 9000 in step S706 or S714, as described above. Therefore, even if the digest file or the attribute file has been altered, the attribute of the program can be specified, in step S806, using the application management data 9000. If the program has a pre-installation attribute, the VM/FW unit 209 advances the processing to step S807, and if not, the VM/FW unit 209 advances the processing to step S808.

In step S807, the VM/FW unit 209 expands the compressed pre-installation package 216, and overwrite-installs the extracted application to the extended application unit 210, similarly to step S710 described above. Then, the VM/FW unit 209 ends the program execution processing.

On the other hand, in step S808, the VM/FW unit 209 displays a message indicating that alteration of the application has been detected, similarly to step S712 described above. Then, the VM/FW unit 209 ends the program execution processing.

As described above, the image processing apparatus according to the present embodiment detects alteration of any application held in the image processing apparatus, and determines whether or not the application in which alteration has been detected is a pre-installed application. Also, if, as a result of the determination, the application in which alteration has been detected is not a pre-installed application, the image processing apparatus performs error display indicating that alteration of the application has been detected, and restricts starting the application. On the other hand, if the application in which alteration has been detected is a pre-installed application, the image processing apparatus re-installs the application such that the application is overwritten using pre-held information, and enables the use of the application. With this, if the program of an altered application has a pre-installation attribute, as a result of performing overwrite-installation using a pre-installation package, the application can be returned to a normal state, and the user-friendliness can be improved. Meanwhile, other than a storage region that stores programs corresponding to respective applications, another storage region need not be provided for storing the same programs, and it is sufficient that only a storage region for a compressed pre-installation package is provided, and as a result, the memory resource can be effectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-130888 filed on Jul. 10, 2018, which is hereby incorporated by reference herein in its entirety.

What is claimed is:

1. An image processing apparatus comprising:
   one or more memory devices that store a set of instructions; and
   one or more processors that execute the set of instructions to:
   store an install package for installing an application, in the one or more memory devices;
   detect alteration of an application which is installed in the image processing apparatus and of which an install package is stored in the one or more memory devices; and
   re-install the application using the stored install package corresponding to the application in which the alteration has been detected in response to detection of the alternation of the application.

2. The image processing apparatus according to claim 1, wherein
   the one or more processors execute the instructions in the memory devices to:
   in response to the detection of the alteration of the application, perform error display indicating that alteration of the application has been detected, and restrict starting the application.

3. The image processing apparatus according to claim 2, wherein the install package is data obtained by compressing information for installing the application.

4. The image processing apparatus according to claim 2, wherein, in the re-installation, installation is performed in a state of holding data to be used in the application.

5. The image processing apparatus according to claim 1, wherein
   the one or more processors execute the instructions in the memory device to:
   display, when the re-installation has been performed, a message indicating that alteration of the application has been detected, and the re-installation of the application has been completed.

6. The image processing apparatus according to claim 1, wherein the application includes an attribute file having type information of the application, a program file for executing the application, and a digest file having information for detecting alteration, and the digest file includes a first digest including information for detecting alteration of the attribute file, a second digest including information for detecting alteration of the program file, and a third digest including information for detecting alteration of the first digest and the second digest.

7. The image processing apparatus according to claim 6, wherein the one or more processors execute the instructions in the memory device to:

detect whether or not the program file is altered, in a case where alteration of the digest file and the attribute file is not detected.

8. The image processing apparatus according to claim 6, wherein the information for detecting alteration is a hash value of an object in which the alteration is detected.

9. The image processing apparatus according to claim 1, wherein the one or more processors execute the instructions in the memory device to:

detect alteration of an application at at least one of a timing at which the image processing apparatus is started and a timing at which the application is executed.

10. The image processing apparatus according to claim 1, wherein the re-install of the application is performed without accepting a user instruction via an operation unit of the image processing apparatus.

11. A control method of an image processing apparatus comprising one or more memory devices, the control method comprising:

storing an install package for installing an application, in the one or more memory devices;

detecting alteration of an application which is installed in the image processing apparatus and of which an install package is stored in the one or more memory devices; and re-installing the application using the stored install package corresponding to the application in which the alteration has been detected in response to detection of the alternation of the application.

12. A non-transitory computer-readable storage medium storing a computer program for causing a computer to execute steps of a control method of an image processing apparatus comprising on or more memory devices, the control method comprising:

detecting alteration of an application which is installed in the image processing apparatus and of which an install package is stored in the one or more memory devices; and re-installing the application using the stored install package corresponding to the application in which the alteration has been detected in response to detection of the alternation of the application.

* * * * *